United States Patent [19]

La Rosa et al.

[11] Patent Number: 5,146,945

[45] Date of Patent: Sep. 15, 1992

[54] SEAL RING RETAINER AND GUIDE RING FOR VALVE PLUG

[75] Inventors: Joachim A. La Rosa, Winter Springs, Fla.; Joseph W. Ross, Huntsville, Ala.; Frank J. Heymann, Winter Springs, Fla.

[73] Assignee: Westinghouse Electric Corp., Pittsburgh, Pa.

[21] Appl. No.: 446,957

[22] Filed: Dec. 6, 1989

[51] Int. Cl.⁵ .................. F16J 9/26; F16K 41/00; F16K 43/00

[52] U.S. Cl. .................. 137/315; 251/214; 251/324; 277/105; 277/187; 277/DIG. 6

[58] Field of Search .................. 92/216, 220; 251/214, 251/324; 277/168, 187, 102, 105, 123, 126, 236, DIG. 6; 137/315

[56] References Cited

U.S. PATENT DOCUMENTS

| | | | |
|---|---|---|---|
| 1,474,024 | 11/1923 | Cowles | 277/236 |
| 2,058,143 | 10/1936 | Flanders | 277/187 |
| 2,201,471 | 5/1940 | Bostwick | 277/187 |
| 2,537,249 | 1/1951 | Walton | 285/157 |
| 3,009,721 | 11/1961 | Newton | 277/187 |
| 3,300,225 | 1/1967 | Shepler | 277/187 |
| 3,434,727 | 3/1969 | Kollenberger | 277/187 |
| 3,722,898 | 3/1973 | von Benningsen | 277/236 |
| 3,773,336 | 11/1973 | Walter et al. | 277/187 |
| 4,088,328 | 5/1978 | Roeder | 277/12 |
| 4,280,601 | 7/1981 | Patriquin | 277/236 |
| 4,325,402 | 4/1982 | Akkerman et al. | 137/270 |
| 4,395,017 | 7/1983 | Brautigan | 251/306 |
| 4,395,049 | 7/1983 | Schertler | 277/236 |
| 4,705,071 | 11/1987 | Connors, Jr. et al. | 251/121 |
| 4,834,133 | 5/1989 | LaCoste et al. | 137/315 |

FOREIGN PATENT DOCUMENTS

| | | | |
|---|---|---|---|
| 1096137 | 12/1960 | Fed. Rep. of Germany | 251/214 |
| 1263660 | 12/1961 | France | 277/187 |

*Primary Examiner*—George L. Walton
*Attorney, Agent, or Firm*—K. Bach

[57] ABSTRACT

A removably securable guide ring (33) for a valve plug (30) in a control valve. The removably securable guide ring (33) also serves as a retainer for a pressure seal ring. The guide ring (33) includes the surface (40) which, upon the guide ring (33) being secured with a valve plug (30), forms a seal ring groove with a stepped portion (34) of the valve plug (30). A seal ring may be installed by removing the guide ring (33) from the valve plug (30), placing the seal ring within the stepped portion (34) of the valve plug (30), and by securing the guide ring (33) with the valve plug (30). As a result, the seal ring is disposed within a seal ring groove formed by a stepped indentation (34) of the valve plug (30) and a surface (40) of the guide ring (33). The guide ring (33) also includes a surface (38) which faces and may abut the inside surface of a valve bonnet (12) during operation. This valve bonnet facing surface (38) of the guide ring (33) operates to guide the valve plug (30) within the valve bonnet (12) during operation of the valve.

17 Claims, 2 Drawing Sheets

SEAL RING RETAINER AND GUIDE RING FOR VALVE PLUG

BACKGROUND OF THE INVENTION

The present invention relates to a combination seal ring retainer and guide ring on a valve plug for use in a control valve, for example a control valve for a steam turbine in a nuclear power plant.

Control valves, such as steam control valves are known to employ a valve plug which is movable with respect to a valve body or bonnet. Conventional control valves include a hollow cylindrical valve bonnet in which a valve plug is movably disposed. Generally, the valve plug is adapted to move axially within the hollow cylindrical bonnet. Apertures or passages formed through the cylindrical wall of the bonnet can be opened or closed for the passage of fluid depending on the position of the valve plug within the bonnet. For example, the apertures can be closed by positioning the valve plug in a location within the bonnet which blocks the passage of fluid through the apertures. The apertures may be opened by moving the valve plug to a position within the bonnet which does not block the passage of fluid through the apertures. In this manner, the position of the valve plug controls the flow of fluid through the apertures provided in the valve bonnet.

For proper operation, the outside diameter of the valve plug should be sealed against the inside diameter of the valve bonnet. With a proper seal between the valve plug and the valve bonnet, fluid will be inhibited from flowing around or past the valve plug. Thus, fluid flow can be controlled to occur only through the apertures provided in the valve bonnet when the valve plug is moved to a position in which the valve plug does not block the apertures.

Conventional control valve designs have also included a guide ring secured to the valve plug. The guide ring is provided with an outside diameter slightly larger than the outside diameter of the valve plug and operates to guide the valve plug within the valve bonnet and to minimize lateral movement between the valve plug and the bonnet. Since the guide ring has an outside diameter slightly larger than the outside diameter of the valve plug, the valve ring may come into contact with the inside surface of the valve bonnet during operation. For this reason, the guide ring, or at least a contacting surface of the guide ring, is generally made of a harder material than the material from which the valve plug is made.

FIGS. 1—3 show an example of a conventional valve body 1 and valve bonnet 2. The valve body 1 defines a hollow area 3. Apertures 4 in the valve bonnet 2 provide a communication path between the hollow area 3 and a fluid outlet 5. Apertures 6 provide a communication path between a space 7 and the outlet 5 through the surface 8 of a valve plug 10. The valve plug 10 and a guide ring 11 are arranged within a hollow cylindrical portion 12 of the valve bonnet 2 arrangement.

FIG. 2 represents a cross-sectional view of the hollow cylindrical portion 12 of the valve bonnet 2 and a cylindrical or cup-shaped valve plug 10. The valve plug 10 is located within the bonnet portion 12 and is movable in the axial direction of the bonnet portion 12. A valve stem 13 extends from the valve plug 10 in the axial direction of the bonnet portion 12. The stem 13 may be attached to a hydraulic actuator (not shown) which controls the movement of the stem 13 and valve plug 10 in a well-known manner. Fluid (e.g., steam) enters the area 3 in the valve body 1 through an inlet not illustrated, and after passing through the opened position of the apertures 4 exits the valve through outlet 5. In order to prevent excessive pressure unbalance forces on the plug 10, pressure balance holes 6 may be located in the flat surface 8 at the bottom of the plug.

FIG. 3 shows a view of the apparatus shown in FIG. 2 taken along reference line 3—3 of FIG. 2.

As shown in FIGS. 1-3, a guide ring 11 is attached to the rim of the cup-shaped valve plug 10. The guide ring 11 has an outer circumferential surface 14 which extends radially outward farther than the outer circumferential surface of the valve plug 10. The surface 14 of the guide ring 11 is arranged adjacent the inside surface of the bonnet portion 12 (or a liner, not shown, provided on the inside surface of the bonnet) when the valve plug 10 and ring 11 are disposed within the bonnet portion 12 as shown in FIGS. 2 and 3. In this manner, the guide ring 11 assists in guiding the valve plug 10 when the valve plug 10 is moved in the axial direction of the bonnet portion 12.

In this regard, the surface 14 or the entire guide ring 11 may be made of a harder material than the material from which the plug wall 10 of the valve plug is made. Furthermore, it is beneficial to provide the guide ring 11 as a separate element so that the guide ring 11 can be easily replaced without replacing the valve plug.

FIG. 2 also shows two seal rings 15 and 16, such as pressure seal rings, which are disposed about the circumference of the valve plug 10. The seal rings may be provided for inhibiting the passage of fluid (e.g., steam) from the space 3 through the annular gap between bonnet portion 12 and valve plug 10 or ring 11, into the space 7, through the pressure balance holes 6 and to the outlet 5. As will be described below, conventional valve plug designs include ring grooves formed in the outer circumferential wall of the valve plug for holding seal rings therein.

Referring to FIG. 1, a portion of the wall of the valve plug 10 is shown as being secured with a guide ring 11 by a bolt 17. The plug wall 10 has a surface 18 which faces the inside surface of the hollow valve bonnet portion 12.

As shown in FIG. 1, the surface 18 of the valve plug 10 is provided with two grooves 19 and 20 adapted to hold the pressure seal rings 16 and 17, respectively. In order to install the seal rings in the grooves 19 and 20, the seal rings must be stretched so as to fit over the surface 18 of the valve plug 10. While being stretched to fit over the surface 18, the seal rings must be positioned over the grooves 19 and 20, whereupon the seal rings can contract to fit within the grooves 19 and 20. Thus, in order to install the seal rings on a conventional system, the seal rings must be elastically expanded to fit over the valve plug and the guide ring. Such stretching or expansion of the seal rings can cause detrimental permanent deformation of the seal rings and can substantially shorten the life expectancy of the seal rings. Furthermore, the requirement that the seal rings be expandable severely limits the materials from which the seals can be made; that is, the seal rings must be made of a material which allows elastic expansion at the expense of other desirable characteristics.

SUMMARY OF THE INVENTION

It is an object of the present invention to provide a seal retaining system for a pressure valve of the type having a valve bonnet and a valve plug movable within the valve bonnet wherein a seal ring may be installed or removed from a valve plug without requiring the seal ring to be stretched or expanded.

It is further an object of the present invention to provide a system wherein a guide ring is removably secured with a valve plug.

These and other objects are accomplished by the present invention which includes a removably secured guide ring which also serves as a retainer for a pressure seal ring. The guide ring according to the present invention includes a surface which, upon the guide ring being secured with a valve plug, forms a seal ring groove with a stepped portion of the valve plug. In this manner, a pressure seal ring may be installed by removing the removably secured guide ring from the valve plug, by placing the seal ring within the stepped portion of the valve plug, and then, by securing the guide ring with the valve plug. As a result, the seal ring is disposed within a seal ring groove formed by the stepped portion of the valve plug and a surface of the guide ring.

Several advantages are thereby realized, including the advantage that the seal ring may be installed or removed without requiring stretching or expansion and, thus, distortion of the seal ring. Furthermore, as the present invention does not require a seal ring to be elastically expanded, the material from which the seal ring is made may be a material that is not elastically expandable. Furthermore, since it is not necessary to stretch the seal rings employed with the present invention, seal rings having a relatively large cross section may be used to thereby resist twisting and/or vibration during operation of the valve. Also, since the guide ring is a separate element with respect to the valve plug, the guide ring can be made of a more wear-resistant material than the valve plug or, alternatively, can be hardened locally at its contact surfaces.

BRIEF DESCRIPTION OF THE DRAWINGS

The detailed description of the invention will be made with reference to the accompanying drawings, wherein like numerals designate corresponding parts in the several figures.

DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1:
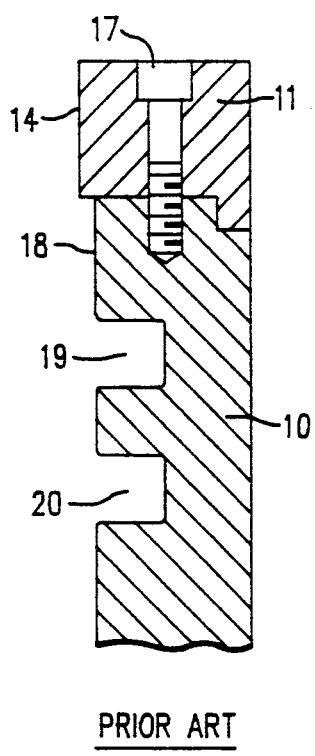
FIG. 1 shows a cross-sectional detail view of a portion of a conventional valve plug and valve guide.
Figure 2:
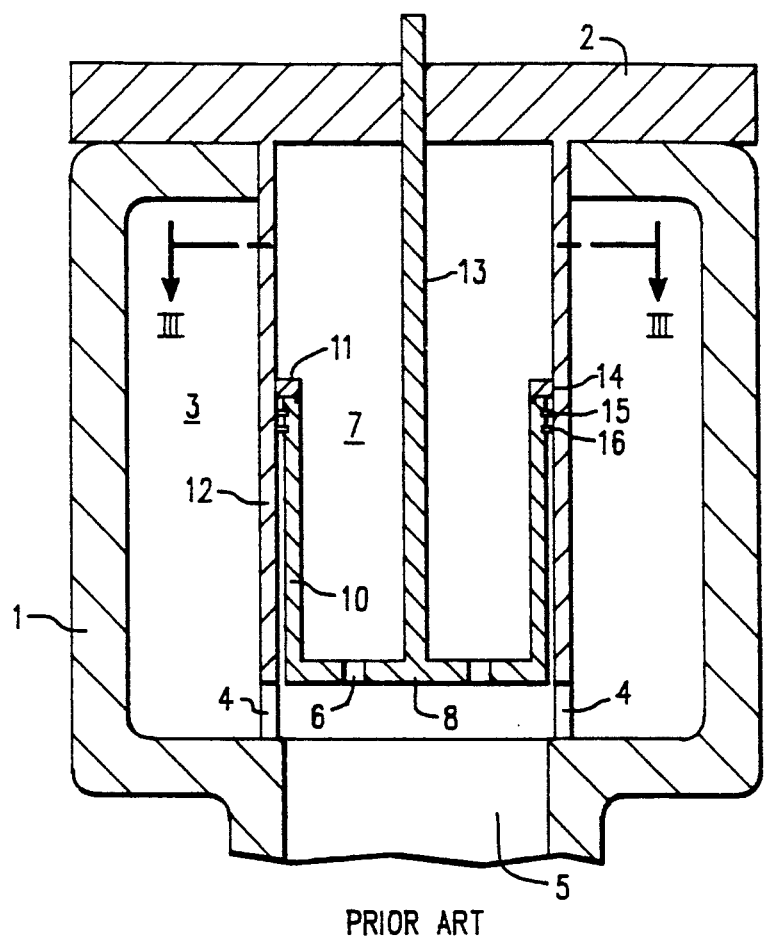
FIG. 2 shows a cross-sectional view of a portion of a conventional valve bonnet and valve plug.
Figure 3:
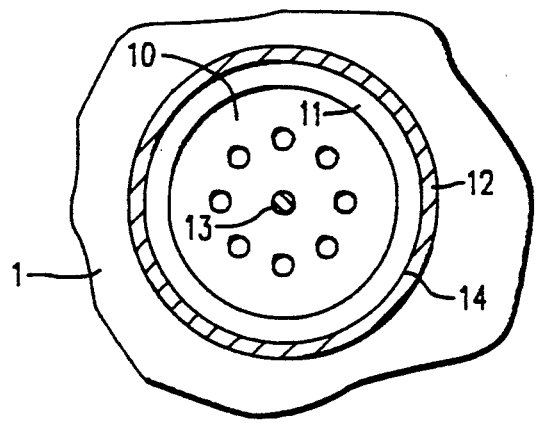
FIG. 3 shows a view taken along line 3—3 of FIG. 2.

The present invention relates to a combination seal ring retainer and guide ring for a control valve system. The following discussion is directed to an application of the present invention on a cylindrically shaped, hollow pressure balanced valve plug which is movably disposed within a hollow cylindrically shaped valve bonnet, such as that illustrated in FIG. 2. However, it will be appreciated that the present invention may be readily employed on other types of valve systems.

Figure 4:
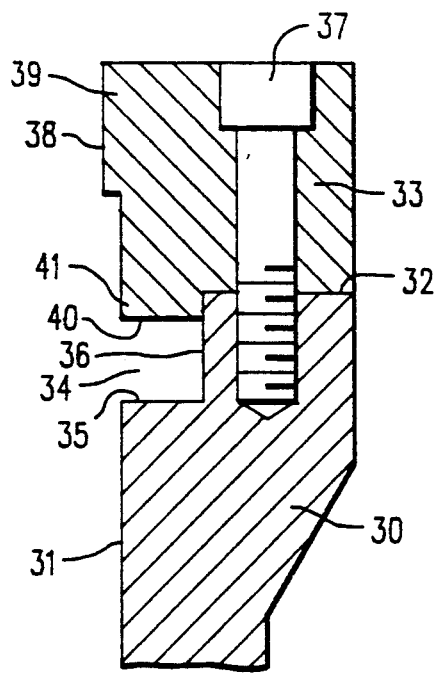
FIG. 4 shows a cross-sectional detail view of a portion of a valve guide ring and valve plug according to an embodiment of the present invention.

An embodiment of the present invention is shown in FIG. 4. With reference to FIG. 4, the cross-section of a portion of an end or rim of a valve plug 30 is shown. The valve plug 30 has a surface 31 which faces the inside surface of a valve bonnet (not shown) during operation. The valve plug 30 also has an end axial surface 32 against which a guide ring 33 abuts. A stepped indentation 34 is provided in the valve plug 30 at the corner where surface 31 and surface 32 would normally meet. As a result of the stepped indentation 34 in the valve plug 30, a first step surface 35 extends from the surface 31 into the valve plug 30 and a second step surface 36 extends from the surface 32 into the valve plug 30 to meet the first step surface 35.

Guide ring 33 is removably secured to surface 32 of valve plug 30 by bolts 37. However, it will be appreciated that any suitable securing means for removably securing the guide ring 33 with the valve plug 30 may be used as an alternative to bolts 37.

The guide ring 33 is provided with a surface 38 which faces the inside surface of the valve bonnet (not shown) during operation. The surface 38 of the guide ring 33 is arranged closer to the inside surface of the valve bonnet (not shown) than the surface 31 of the valve plug 30 during operation. That is, the surface 38 is the outer surface of an outwardly extending portion 39 of the guide ring 33.

Guide ring 33 is provided with a surface 40 which extends adjacent a section of the stepped indentation 34 when the guide ring 33 is secured with the valve plug 30. The surface 40 may extend substantially parallel to the surface 32 of the valve plug 30 when the guide ring 33 is secured with the valve plug 30. Surface 40 is provided on a stepped portion 41 of the guide ring 33. The stepped portion 41 extends axially from the main part of guide ring 33, and into a portion of the stepped indentation 34 when the guide ring 33 is secured to the valve plug 30. This arrangement allows the annular guide ring 33 to seat on the rim of the valve plug and resist lateral movement with respect to the valve plug.

Surface 40 of the guide ring 33 and the surfaces 35 and 36 of the valve plug 30 form a three-sided, annular seal ring retaining groove having an opening facing the inside surface of the valve bonnet during operation. A pressure seal ring (not shown in FIG. 4) may be placed within the stepped indentation 34 prior to securing the guide ring 33 to the valve plug 30. After the seal is placed in the stepped indentation 34, the guide ring 33 can be secured to the valve plug 30 so that the surface 40 of the guide ring 33 extends adjacent the seal (not shown) to form the third surface of the three-sided seal retaining groove. In this manner, the seal (not shown) may be placed within a three-sided seal groove without stretching or expanding the seal. Furthermore, the seal ring may be removed from the three-sided seal groove by first removing the removable guide ring 33 from the valve plug 30 and then by sliding the seal out of the stepped indentation 34 of the valve plug 30.

Figure 5:
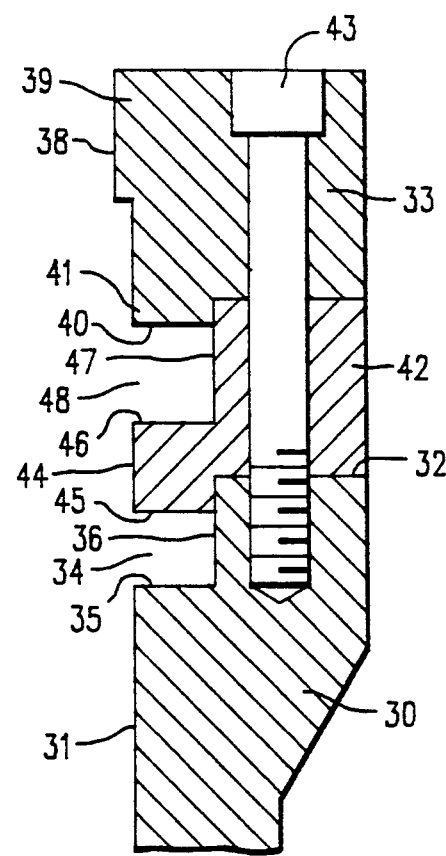
FIG. 5 shows a cross-sectional detail view of a portion of another embodiment of the present invention.

FIG. 5 shows another embodiment of the present invention which includes valve plug 30 having stepped surfaces 35 and 36, a bonnet facing surface 31, a surface 32, stepped indentation 34 and a guide ring 33 having an outwardly extending portion 39 and surfaces 38 and 40 such as described above with reference to FIG. 4. However, the FIG. 5 embodiment differs from the FIG. 4 embodiment in that a retainer 42 is interposed between the guide ring 33 and the valve plug 30. The guide ring 33, the retainer 42, and the valve plug 30 are removably connected with each other by bolts 43. However, other suitable connecting devices may be used as an alternative to bolts 43.

The retainer 42 has a first surface 44 which faces the inside surface of the valve bonnet (not shown in FIG. 5) during operation. The surface 44 is substantially coplanar with surface 31 of the valve plug 30. The retainer 42 has a second surface 45 which extends adjacent the stepped indentation 34 of the valve plug 30. The surface 45 of the retainer 42 and the surfaces 35 and 36 of the valve plug 30 form a three-sided groove having an opening facing toward the inside surface of the valve bonnet (not shown) during operation.

The retainer 42 also has a third surface 46 extending from the bonnet facing surface 44 into the retainer 42. A fourth surface 47 of the retainer 42 extends from the surface 46 (upwards with respect to FIG. 5) toward the guide ring 33. The surfaces 46 and 47 of the retainer 42 form a stepped indentation 48 similar to the stepped indentation 34 formed by surfaces 35 and 36 of the valve plug 30. When the guide ring 33, the retainer 42, and the valve plug 30 are connected as shown in FIG. 5, the surface 40 of the guide ring 33 extends adjacent the stepped indentation 48 to form a three-sided groove having an opening facing the inside wall of the valve bonnet (not shown in FIG. 5) during operation.

The structure shown in FIG. 5 and described above provides two three-sided grooves which open toward the inside surface of the valve bonnet during operation. Each three-sided groove is provided for accommodating a seal ring. Thus, the structure may accommodate two seal rings. Furthermore, seal rings may be installed in the grooves without stretching or deforming the seals; that is, by removing the bolts 43, the retainer 42 and the guide ring 33 may be separated from the valve plug 30 so that a seal ring can be slipped into the stepped indentation 34. After the seal ring is placed in the stepped indentation 34, the retainer 42 can be placed adjacent the valve plug 30 and a second seal ring can be placed in the stepped indentation 48 of the retainer 42. After the second seal ring is placed in the stepped indentation 48, the guide ring 33 can be placed adjacent the retainer 42 and the bolts 43 can secure the guide ring 33, retainer 42 and valve plug 30.

Moreover, removal of the seal rings can be performed by removing the bolts 43 and separating the guide ring 33, retainer 42 and valve plug 30. Upon separation of these elements, the seal rings will be seated within two stepped indentations rather than within two three-sided grooves. The seal rings can then be merely slipped out of the stepped portion and do not need to be stretched or deformed in order to be removed. Other embodiments may be provided with multiple retainers 42 to provide three or more three-sided seal retaining grooves.

Figure 6:
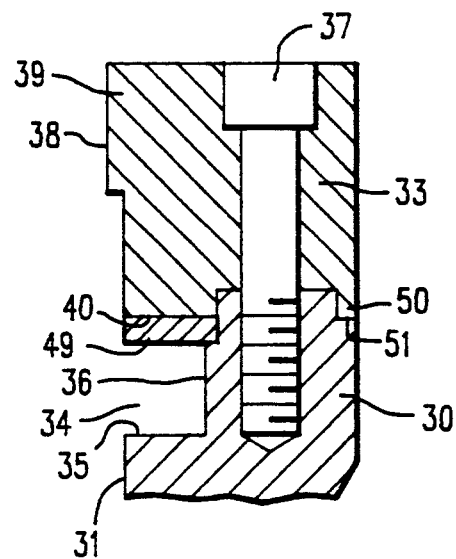
FIG. 6 shows a cross-sectional detail view of a portion of yet another embodiment of the present invention.

Another embodiment of the present invention is shown in FIG. 6. The FIG. 6 embodiment differs from the FIG. 4 embodiment by the inclusion of a replaceable wear ring 49 located adjacent the surface 40. When the guide ring 33 is connected with the valve plug 30, the replaceable wear ring 49 is clamped between plug 30 and ring 33 and extends from the surface 40 into the stepped indentation 34 of the valve plug 30. In this manner, a three-sided groove is formed by the surfaces 35 and 36 of the valve plug 30 and the replaceable wear ring 49. The three-sided groove thus formed is provided for accommodating a seal ring as described above with respect to the FIG. 4 and FIG. 5 embodiments.

The inclusion of the replaceable wear ring 49 provides a replaceable surface against which a seal accommodated in the three-sided groove may abut. In this manner, the surface 40 of the guide ring 33 is protected against wear and damage caused by abutting a seal ring during the operation of the valve. As a result, the operational life of the guide ring 33 is extended by the inclusion of the replaceable wear ring 49.

The FIG. 6 embodiment also differs from the FIG. 4 embodiment by the inclusion of an extending portion 50. The extending portion 50 extends downward from the right side of the guide ring 33 shown in FIG. 6 and seats within a stepped portion 51 provided in the valve plug 30. The extending portion 50 and the stepped portion 51 allow the guide ring 33 to seat on the valve plug 30 and inhibit lateral movement of the guide ring 33 with respect to the valve plug 30.

It will be recognized that other embodiments may be provided with the valve plug having an extending portion similar to portion 50 and a guide ring having a stepped portion similar to portion 51. Additionally, the extending portion 50 and stepped portion 51 arrangement may be employed with any pair of abutting elements (e.g., guide ring 33, valve plug 30 and retainer 42) shown in FIGS. 4 and 5.

Figure 7:
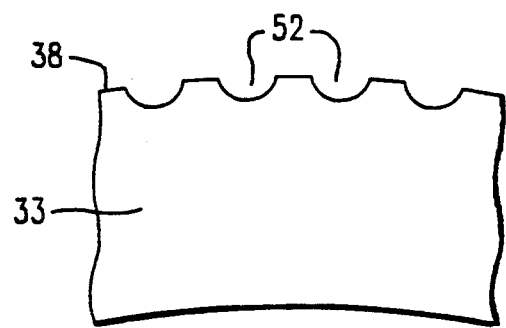
FIG. 7 shows a detail top view of a portion of a valve guide ring according to an embodiment of the present invention.

FIG. 7 shows a top view of an embodiment of a portion of the guide ring 33 and its bonnet facing surface 38 as shown in FIGS. 4-6. In FIG. 7, the surface 38 is provided with a plurality of scallops or indentations 52 which allow communication of pressure across the guide ring 33 so that excessive pressure is not allowed to build up on one side of the guide ring 33 (e.g., below the guide ring 33 shown in FIGS. 4-6). It is believed that valve components (e.g., the guide ring 33, the valve plug 30 and the pressure seals) are caused to vibrate by the occurrence of a significant difference between the pressure on one side of the guide ring 33 (e.g., over the guide ring 33 in FIGS. 4-6) and the pressure on the other side of the guide ring 33 (e.g., below the guide ring 33 in FIGS. 4-6. The scallops 52 tend to equalize the pressure across the guide ring 33 and thereby reduce the occurrence of vibrations.

The invention described above relates to an improvement in valve plug sealing arrangements and plug guide rings. According to the invention, a guide ring of a valve plug is designed to act as a seal ring retainer. Furthermore, the valve plug is provided with a stepped indentation rather than a groove in its outside diameter so that a seal ring may be installed or removed from the valve plug without stretching or deforming the seal ring.

The above-described embodiments provide several advantages which are not available with conventional valve seal arrangements. For example, with the above-described embodiments, seal rings no longer need to be expanded in order to be installed or removed. As a result, the problem of plastic deformation or distortion of seal rings due to the seal rings being expanded for installation or removal is eliminated. Furthermore, sealing rings having a relatively large cross section may be employed where, in the past, such would be difficult or impossible to stretch in order to fit in prior groove arrangements. The ability to employ rings having a relatively large cross section is advantageous because such rings are more resistent to twisting and/or vibration under the action of fluid and/or friction forces. The seal rings with relatively large cross sections, therefore, help reduce wear and binding or jamming of the valve plug.

Another advantage of the embodiments described above is the ability to remove a seal ring contacting surface (e.g., surface 40) from the valve plug 30 in the event that the ring contacting surface needs to be replaced or repaired. Furthermore, in the FIG. 5 embodiment, several ring contacting surfaces (e.g., surfaces 45, 46, 47 and 40) are provided on easily removable parts. Thus, such easily removable parts may be removed for replacement or repair of ring contacting surfaces. Alternatively, these easily removable elements may be replaced in their entirety upon the occurrence of damage or wear to the ring contacting surfaces.

As a result of the ease with which the ring contacting surfaces can be replaced or repaired, as described above, and also as a result of the ability to install or remove seal rings without stretching or deforming the rings, seal rings formed from a relatively wide variety of materials may be employed with embodiments of the present invention. For example, seal rings made of a harder, more wear resistent material than are normally used in valve arrangements may be used with embodiments of the present invention. Thus, seals formed from a more wear resistant material than the valve plug or having hardened contact surfaces may be employed.

Furthermore, with the embodiment shown in FIG. 6, additional freedom in the choice of seal ring materials is available. Since the war ring 49 provides added protection from wear on the surface 40 of the guide ring 33, and since the wear ring 49 is replaceable, the FIG. 6 embodiment may operate with a seal ring which is formed of a material that would otherwise cause excessive damage to a seal abutting surface during prolonged use.

The presently disclosed embodiments are to be considered in all respects as illustrative and not restrictive, the scope of the invention being indicated by the appended claims, rather than the foregoing description. All changes which come within the meaning and range of equivalency of the claims are intended to be embraced therein.

What is claimed:

1. In a control valve having a substantially hollow cylindrical bonnet provided with an inner circumferential surface, the improvement comprising:

a valve plug disposable within the bonnet and having an outer circumferential surface arranged to face the inner circumferential surface of the bonnet when disposed within the bonnet, the outer circumferential surface of the valve plug having an axial end and a stepped indentation extending about the periphery of the valve plug at the axial end;

a guide ring securable to the valve plug, the guide ring having a first surface which faces the inner circumferential surface of the bonnet when the guide ring is secured to the valve plug and the valve plug is disposed within the bonnet, the guide ring having a second surface which extends adjacent the stepped indentation of the valve plug when the guide ring is secured to the valve plug, the guide ring being formed to have at least one fluid flow passage extending across the entirety of said first surface of said guide ring for equalizing the pressure across said guide ring and thereby reducing the occurrence of vibration of said valve plug and guide ring;

wherein the stepped indentation of the valve plug and the second surface of the guide ring form an annular, three-sided, seal retaining groove when the guide ring is secured to the valve plug;

a seal ring, which is not elastically expandable, disposed within said seal retaining groove and contacting at least one side of said groove.

2. The control valve as claimed in claim 1, wherein the valve plug is made of a first material and the guide ring is made of a second material, the second material being harder than the first material.

3. The control valve as claimed in claim 1, wherein at least one of the first and second surfaces is a hardened surface.

4. The control valve as claimed in claim 1, wherein said guide ring comprises:

a first ring member securable with the valve plug, the first surface being provided on the first ring member;

a second ring member secured with the first ring member, the second surface being provided on the second ring member.

5. The control valve as claimed in claim 4, wherein the second ring member is removable and replaceable with respect to the first ring member.

6. The control valve as claimed in claim 1, further comprising a replaceable wear ring disposed adjacent the second surface of the guide ring.

7. The control valve as claimed in claim 1, wherein the guide ring is formed to have a plurality of said fluid flow passages distributed around said first surface of said guide ring.

8. In a control valve having a substantially hollow cylindrical bonnet provided with an inner circumferential surface, the improvement comprising:

a valve plug disposable within the bonnet and having an outer circumferential surface arranged to face the inner circumferential surface of the bonnet when disposed within the bonnet, the outer circumferential surface of the valve plug having a stepped indentation extending about the periphery of the valve plug;

a retaining ring securable to the valve plug, the retaining ring having a first surface which extends adjacent the stepped indentation of the valve plug when the retaining ring is secured with the valve plug, the retaining ring having an outer circumferential surface which faces the inner circumferential surface of the bonnet when the retaining ring is secured with the valve plug and the valve plug is disposed within the bonnet, the outer circumferential surface of the retaining ring having a stepped indentation extending about the periphery of the retaining ring; and a guide ring securable to the retaining ring, the guide ring having a second surface which faces the inner circumferential surface of the bonnet when the guide ring is secured with the retaining ring which is secured with the valve plug and the valve plug is disposed within the bonnet, the guide ring having a third surface which extends adjacent the stepped indentation of the retaining ring when the guide ring is secured with the retaining ring, the guide ring being formed to have at least one fluid flow passage extending across the entirety of said first surface of said guide ring for equalizing the pressure across said guide ring and thereby reducing the occurrence of vibration of said valve plug and guide ring;

wherein the stepped indentation of the valve plug and the first surface of the retaining ring form a first three-sided annular groove and the stepped indentation of the retaining ring and the third surface of the guide ring form a second three-sided annular groove when the guide ring, retaining ring and valve plug are secured with each other.

9. The control valve as claimed in claim 8, wherein the guide ring is formed to have a plurality of said fluid flow passages distributed around said first surface of said guide ring.

10. In a control valve having a substantially hollow cylindrical bonnet provided with an inner circumferential surface, the improvement comprising:

a valve plug disposable within the bonnet and having an outer circumferential surface arranged to face the inner circumferential surface of the bonnet when disposed within the bonnet, the outer circumferential surface of the valve plug having an axial end and a stepped indentation extending about the periphery of the valve plug at the axial end;

a guide ring securable to the valve plug, the guide ring having a first surface which faces the inner circumferential surface of the bonnet when the guide ring is secured to the valve plug and the valve plug is disposed within the bonnet, the guide ring having a second surface which extends adjacent the stepped indentation of the valve plug when the guide ring is secured to the valve plug, the guide ring being formed to have at least one fluid flow passage extending across the entirety of said first surface of said guide ring for equalizing the pressure across said guide ring and thereby reducing the occurrence of vibration of said valve plug and guide ring;

wherein the stepped indentation of the valve plug and the second surface of the guide ring form an annular, three-sided, seal retaining groove when the guide ring is secured to the valve plug.

11. The control valve as claimed in claim 10, wherein said pressure communication means comprises at least one channel provided across said first surface of said guide ring.

12. The control valve as claimed in claim 10, wherein the valve plug is made of a first material and the guide ring is made of a second material, the second material being harder than the first material.

13. The control valve as claimed in claim 10, wherein at least one of the first and second surfaces is a hardened surface.

14. The control valve as claimed in claim 10, wherein said guide ring comprises:

a first ring member securable with the valve plug, the first surface being provided on the first ring member;

a second ring member secured with the first ring member, the second surface being provided on the second ring member.

15. The control valve as claimed in claim 14, wherein the second ring member is removable and replaceable with respect to the first ring member.

16. The control valve as claimed in claim 10, further comprising a replaceable wear ring disposed adjacent the second surface of the guide ring.

17. The control valve as claimed in claim 10, wherein the guide ring is formed to have a plurality of said fluid flow passages distributed around said first surface of said guide ring.

* * * * *